United States Patent
Yoo

(10) Patent No.: US 9,753,263 B2
(45) Date of Patent: Sep. 5, 2017

(54) ZOOM LENS SYSTEM

(71) Applicant: HANWHA TECHWIN CO., LTD., Changwon-si (KR)

(72) Inventor: Jiyeong Yoo, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 36 days.

(21) Appl. No.: 14/855,851

(22) Filed: Sep. 16, 2015

(65) Prior Publication Data

US 2016/0363743 A1    Dec. 15, 2016

(30) Foreign Application Priority Data

Jun. 9, 2015  (KR) ................. 10-2015-0081533

(51) Int. Cl.
| | |
|---|---|
| *G02B 15/177* | (2006.01) |
| *G02B 5/20* | (2006.01) |
| *G02B 15/163* | (2006.01) |
| *G02B 15/20* | (2006.01) |
| *G02B 15/16* | (2006.01) |
| *G02B 13/14* | (2006.01) |

(52) U.S. Cl.
CPC ........... *G02B 15/177* (2013.01); *G02B 5/208* (2013.01); *G02B 13/146* (2013.01); *G02B 15/161* (2013.01); *G02B 15/163* (2013.01); *G02B 15/20* (2013.01)

(58) Field of Classification Search
CPC .... G02B 15/177; G02B 15/16; G02B 15/161; G02B 15/163; G02B 15/20; G02B 5/208
USPC .................................. 359/350, 354, 676, 691
See application file for complete search history.

(56) References Cited

U.S. PATENT DOCUMENTS

| | | | | | |
|---|---|---|---|---|---|
| 4,196,969 | A | * | 4/1980 | Itoh ...................... | G02B 15/177 359/680 |
| 5,737,129 | A | * | 4/1998 | Ohtake ............... | G02B 15/177 359/684 |
| 6,304,389 | B1 | * | 10/2001 | Shibayama .......... | G02B 15/177 359/676 |
| 7,436,597 | B2 | | 10/2008 | Nagatoshi | |

(Continued)

FOREIGN PATENT DOCUMENTS

| | | |
|---|---|---|
| JP | 2008-145770 A | 6/2008 |
| JP | 2010-44235 A | 2/2010 |

(Continued)

*Primary Examiner* — William R Alexander
(74) *Attorney, Agent, or Firm* — Sughrue Mion, PLLC

(57) ABSTRACT

A zoom lens system includes: a first lens group having a negative refractive power; a second lens group having a positive refractive power; and an aperture between the first and second lens groups, wherein the first lens group and the second lens group are sequentially arranged from an object side to an image side, wherein the zoom lens system performs zooming and focusing by moving the second and first lens groups, respectively, along an optical axis, and satisfies $$2.5<(f_w/f_t)\times(T_w/Y)<4.5,$$

where $f_w$ denotes an entire focal length at a wide-angle end, $f_t$ denotes an entire focal length at a telephoto end, and Tw denotes a distance between an image plane and an object side lens surface of a lens closest to the object side of the first lens group at the wide-angle end, and Y denotes a radical axis image height.

20 Claims, 15 Drawing Sheets

(56) References Cited

U.S. PATENT DOCUMENTS

| | | | |
|---|---|---|---|
| 8,045,275 B2 | 10/2011 | Park | |
| 8,085,474 B2 | 12/2011 | Wei | |
| 8,724,232 B2 | 5/2014 | Katsuragi | |
| 2003/0179466 A1* | 9/2003 | Takatsuki | G02B 15/177 359/691 |
| 2003/0206736 A1* | 11/2003 | Nishina | G02B 15/173 396/72 |
| 2004/0076417 A1* | 4/2004 | Miyatake | G02B 15/177 396/72 |
| 2006/0146420 A1* | 7/2006 | Yamada | G02B 15/173 359/686 |
| 2007/0223102 A1* | 9/2007 | Betensky | G02B 15/177 359/680 |
| 2009/0290227 A1* | 11/2009 | Izuhara | G02B 15/177 359/682 |
| 2011/0205638 A1* | 8/2011 | Wei | G02B 15/177 359/691 |
| 2012/0050883 A1* | 3/2012 | Arai | G02B 15/177 359/680 |
| 2012/0154913 A1* | 6/2012 | Misaka | G02B 27/646 359/557 |
| 2012/0243107 A1* | 9/2012 | Abe | G02B 15/177 359/680 |
| 2012/0314297 A1* | 12/2012 | Kim | G02B 15/177 359/683 |
| 2014/0198392 A1* | 7/2014 | Han | G02B 15/177 359/680 |
| 2016/0124181 A1* | 5/2016 | Noda | G02B 13/009 359/680 |

FOREIGN PATENT DOCUMENTS

| | | |
|---|---|---|
| JP | 2011-133656 A | 7/2011 |
| KR | 10-2011-0040463 A | 4/2011 |
| KR | 10-2012-0046012 A | 5/2012 |
| KR | 10-2014-0091345 A | 7/2014 |

* cited by examiner

ZOOM LENS SYSTEM

CROSS-REFERENCE TO THE RELATED APPLICATION

This application claims priority from Korean Patent Application No. 10-2015-0081533, filed on Jun. 9, 2015, in the Korean Intellectual Property Office, the disclosure of which is incorporated herein in its entirety by reference.

BACKGROUND

1. Field

Apparatuses consistent with exemplary embodiments of the inventive concept relate to zoom lens system, and more particularly, to a two-group zoom lens system.

2. Description of the Related Art

As solid imaging devices such as a charge-coupled device (CCD) or a complementary metal oxide semiconductor (CMOS) have recently been reduced in size while the number of pixels has been increased, the demand for high optical performance and compact size is also increasing regarding a lens system included in an imaging optical device such as a digital camera, a video camera or a surveillance camera including an imaging device.

As users of digital cameras and surveillance cameras are becoming more specialized and the number of users is increasing, the demand for imaging devices having high magnification and high optical performance is increasing. Accordingly, a zoom lens included in digital cameras or surveillance cameras is also required to have high performance, high magnification, a compact size, and be lightweight.

SUMMARY

Exemplary embodiments of the inventive concept provide a two-group zoom lens system having a compact size and being capable correcting aberrations from a visible ray range to a near infrared range so as to be able to capture high-resolution images both during the day and also at night.

Various aspects of the inventive concept will be set forth in part in the description which follows and, in part, will be apparent from the description, or may be learned by practice of the presented embodiments.

According to one or more exemplary embodiments, there is provided a zoom lens system which may include: a first lens group having a negative refractive power; a second lens group having a positive refractive power; and an aperture disposed between the first lens group and the second lens group, wherein the first lens group and the second lens group are sequentially arranged from an object side to an image side, wherein the zoom lens system performs zooming by moving the second lens group along an optical axis, performs focusing by moving the first lens group along the optical axis, and satisfies the conditional expression below:

$$2.5<(f_w/f_t)\times(T_w/Y)<4.5,$$

where $f_w$ denotes an entire focal length at a wide-angle end, $f_t$ denotes an entire focal length at a telephoto end, Tw denotes a distance between an image plane and an object side lens surface of a lens that is closest to the object side of the first lens group at the wide-angle end, and Y denotes a radical axis image height.

The zoom lens system may satisfy conditional expressions below:

$$2.5<|f_1/f_w|<3.0,$$

$$0.8<|f_1/f_2|<1.0, \text{ and}$$

$$3.1<|f_2/f_w|<3.5,$$

where $f_1$ denotes a focal length of the first lens group, and $f_2$ denotes a focal length of the second lens group.

The first lens group may include: a first lens having a negative refractive power; a second lens having a negative refractive power; and a third lens having a positive refractive power, wherein the first lens, the second lens, and the third lens are sequentially arranged from the object side to the image side.

The second lens and the third lens may be cemented lenses.

The zoom lens system may satisfy a conditional expressions below:

$$vd_{12}>65, \text{ and}$$

$$Nd_{13}>1.90,$$

where $vd_{12}$ denotes an Abbe number of the second lens, and $Nd_{13}$ denotes a refractive index of the third lens at a d-line.

The second lens group may include: a fourth lens, a fifth lens, and a sixth lens each having a positive refractive power; a seventh lens having a negative refractive power; and an eighth lens and a ninth lens each having a positive refractive power, wherein the fourth lens, the fifth lens, the sixth lens, the seventh lens and the eighth lens are sequentially arranged from the object side to the image side.

The fourth lens may include at least one aspherical lens, wherein the zoom lens system satisfies a conditional expression below:

$$vd_{24}>60,$$

where $vd_{24}$ denotes an Abbe number of the fourth lens.

The sixth lens, the seventh lens, and the eighth lens may be triple cemented lenses.

The zoom lens system may satisfy a conditional expression below:

$$3.5<|(vd_{28}-vd_{27})|/vd_{26}<5.0$$

where $vd_{26}$, $vd_{27}$, and $vd_{28}$ respectively denote Abbe numbers of the sixth lens, the seventh lens, and the eighth lens.

The zoom lens system may satisfy a conditional expression below:

$$vd_{26}<vd_{27}<vd_{28},$$

where $vd_{26}$, $vd_{27}$, and $vd_{28}$ respectively denote Abbe numbers of the sixth lens, the seventh lens, and the eighth lens.

The zoom lens system may further include a near infrared light blocking filter between the first lens group and the second lens group.

According to one or more exemplary embodiments, there is provided a zoom lens system which may include: a first lens group having a negative refractive power; a second lens group having a positive refractive power; and an aperture disposed between the first lens group and the second lens group, wherein the first lens group and the second lens group are sequentially arranged from an object side to an image side, wherein the zoom lens system performs zooming by moving the second lens group along an optical axis and performs focusing by moving the first lens group along the optical axis, wherein the second lens group includes: a fourth lens, a fifth lens, and a sixth lens each having a positive refractive power; a seventh lens having a negative refractive power; and an eighth lens and a ninth lens each having a positive refractive power, wherein the fourth lens, the fifth lens, the sixth lens, the seventh lens and the eighth lens are sequentially arranged from the object side to the image side, wherein the zoom lens system satisfies a conditional expression below:

$$3.5 < |(vd_{28} - vd_{27})|/vd_{26} < 5.0,$$

where $vd_{26}$, $vd_{27}$, and $vd_{28}$ respectively denote Abbe numbers of the sixth lens, the seventh lens, and the eighth lens.

The sixth lens, the seventh lens, and the eighth lens may be cemented lenses.

The zoom lens system may satisfy a conditional expression below:

$$vd_{26} < vd_{27} < vd_{28},$$

where $vd_{26}$, $vd_{27}$, and $vd_{28}$ respectively denote Abbe numbers of the sixth lens, the seventh lens, and the eighth lens.

The fourth lens may include at least one aspherical lens, wherein the zoom lens system satisfies a conditional expression below:

$$vd_{24} > 60,$$

where $vd_{24}$ denotes an Abbe number of the fourth lens.

The zoom lens system may satisfy a conditional expression below:

$$2.5 < (f_w/f_t) \times (T_w/Y) < 4.5,$$

where $f_w$ denotes an entire focal length at a wide-angle end, $f_t$ denotes an entire focal length at a telephoto end, and Tw denotes a distance between an image plane and an object side lens surface of a lens that is closest to the object side of the first lens group at a wide-angle end, and Y denotes a radical axis image height.

The zoom lens system may satisfy conditional expressions below:

$$2.5 < |f_1/f_w| < 3.0,$$

$$0.8 < |f_1/f_2| < 1.0, \text{ and}$$

$$3.1 < |f_2/f_w| < 3.5,$$

where $f_1$ denotes a focal length of the first lens group, and $f_2$ denotes a focal length of the second lens group.

The first lens group may include: a first lens having a negative refractive power; a second lens having a negative refractive power; and a third lens having a positive refractive power, wherein the first lens, the second lens, and the third lens are sequentially arranged from the object side to the image side, and the second lens and the third lens are cemented lenses.

The zoom lens system may satisfy conditional expressions below:

$$vd_{12} > 65, \text{ and}$$

$$Nd_{13} > 1.90,$$

where $vd_{12}$ denotes an Abbe number of the second lens, and $Nd_{13}$ denotes a refractive index of the third lens at a d-line.

The zoom lens system may further include a near infrared light blocking filter between the first lens group and the second lens group.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF THE EXEMPLARY EMBODIMENTS

Figure 1:
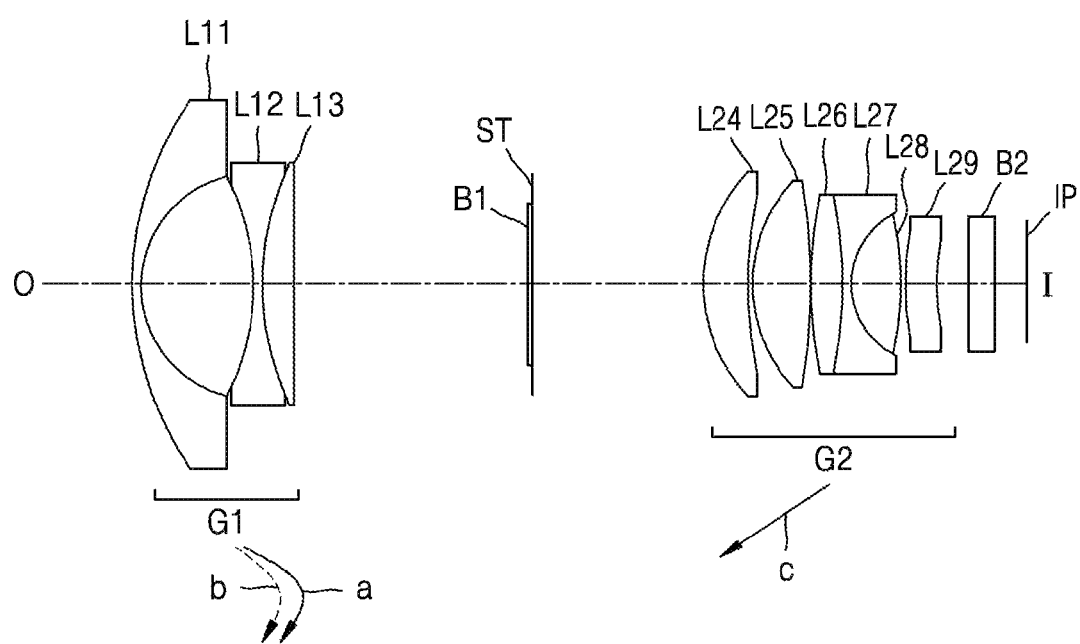
FIG. 1 illustrates an optical layout of a zoom lens system, according to an exemplary embodiment of the inventive concept.

Reference will now be made in detail to exemplary embodiments which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain various aspects of the inventive concept.

As the inventive concept allows for various changes and numerous embodiments, particular exemplary embodiments will be illustrated in the drawings and described in detail in the written description. The effects and features of the inventive concept, and a method for achieving those will be clearly understood by referring to these embodiments described in detail together with drawings. This inventive concept may, however, be embodied in many different forms and should not be construed as limited to the exemplary embodiments set forth herein.

Hereinafter, exemplary embodiments of the inventive concept will be described in more detail with reference to the accompanying drawings. Those components that are the same or are in correspondence are rendered the same reference numeral regardless of the figure number, and redundant explanations are omitted.

While such terms as "first," "second," etc., may be used to describe various components, such components must not be limited to the above terms. The above terms are used only to distinguish one component from another.

An expression used in the singular encompasses the expression of the plural, unless it has a clearly different meaning in the context.

In the present specification, it is to be understood that the terms such as "including" or "having," etc., are intended to indicate the existence of the features, or components and are not intended to preclude the possibility that one or more other features, or components thereof may exist or may be added.

For convenience of explanation, the size of elements may be exaggerated or reduced. For example, the size and thickness of each element shown in drawings are shown arbitrarily for convenience of explanation and the inventive concept is not necessarily limited by the drawings.

Expressions such as "at least one of," when preceding a list of elements, modify the entire list of elements and do not modify the individual elements of the list.

FIGS. 1, 4, 7, 10, and 13 illustrate an optical layout of a zoom lens system according to exemplary embodiments of the inventive concept.

Referring to FIGS. 1, 4, 7, 10, and 13, the zoom lens system includes a first lens group G1, an aperture ST, and a second lens group G2 in an order from an object side O to an image side I. The first lens group G1 and the second lens group G2 respectively have a negative refractive power and a positive refractive power, and the aperture ST may be disposed between the first lens group G1 and the second lens group G2.

The zoom lens system may perform zooming by moving the second lens group G2 along an optical axis, and may perform focusing by moving the first lens group G1 along the optical axis. A direction c illustrated in FIG. 1 denotes a movement direction of the second lens group G2 during zooming, and directions a and b denote a movement direction of the first lens group G1 to correct a change in a focus according to zooming. The directions a and b respectively denote movement directions of the first lens group G1 during focusing on objects at a far distance and a short distance.

The zoom lens system has excellent optical performance not only with respect to visible light but also infrared light, and a near infrared light blocking filter B1 may be disposed between the first lens group G1 and the second lens group G2. The near infrared light blocking filter B1 may be disposed in front of the aperture ST during daytime when visible light reflected by an object is captured, and may be disposed in an outer portion with respect to a path of incident light during night time when infrared light reflected by the subject is captured.

By disposing the near infrared light blocking filter B1 between the first lens group G1 and the second lens group G2, a short distance between the lens group G2 and an image plane IP may be provided to thereby reduce a size of the zoom lens system.

The zoom lens system according to exemplary embodiments may satisfy Conditional Expression 1 below.

$$2.5 < (f_w/f_t) \times (T_w/Y) < 4.5$$ <Conditional Expression 1>

Here, $f_w$ denotes an entire focal length at a wide-angle end, $f_t$ denotes an entire focal length at a telephoto end, $T_w$ denotes a distance between the image plane IP and an object side lens surface of a lens that is closest to the object side O of the first lens group G1 at the wide-angle end, and Y denotes a radical axis image height. The radical axis image height may correspond to half of a diagonal distance of an image plane IP of an image sensor.

<Conditional Expression 1> defines a range of a ratio between the entire size of an optical system and an image height when a focal length at the wide-angle end and a focal length at the telephoto end have predetermined ratios. In a range equal to or less than the lower limit of <Conditional Expression 1>, a size of the optical system is small compared to an image height, and thus, it is difficult to configure a zoom lens system capable of forming an image, and in a range equal to or higher than the upper limit of <Conditional Expression 1>, a size of the optical system is increased compared to an image height and thus it may be difficult to configure the optical system having a compact size. That is, when <Conditional Expression 1> is satisfied, even if the size of the image plane IP of the image sensor increases due to demand for a high pixel resolution, a zoom lens system including an optical system having a short total length may be provided.

The zoom lens system according to exemplary embodiments may satisfy Conditional Expression 2 below.

$$2.5 < |f_1/f_w| < 3.0$$ <Conditional Expression 2>

Here, $f_1$ denotes a focal length of the first lens group G1.

<Conditional Expression 2> expresses a range of a ratio of a focal length of the first lens group G1 with respect to a focal length at the wide-angle end, and defines a refractive power of the first lens group G1. When $|f_1/f_w|$ is within the range of <Conditional Expression 2>, aberration in the periphery region may be controlled and a compact size of the zoom lens may be achieved. When $|f_1/f_w|$ is equal to or less than the lower limit of <Conditional Expression 2>, aberration may occur in the periphery region, and when $|f_1/f_w|$ is equal to or greater than the upper limit of <Conditional Expression 2>, it may difficult to obtain a wide angle, and the effective diameter of a lens that is closest to the object side O included in the first lens group G1 is increased, thus making it difficult to achieve a zoom lens having a compact size.

The zoom lens system according to exemplary embodiments may satisfy <Conditional Expression 3> below.

$$0.8 < |f_1/f_2| < 1.0$$ <Conditional Expression 3>

Here, $f_2$ denotes a focal length of the second lens group G2.

<Conditional Expression 3> denotes a range of a ratio of a focal length of the first lens group G1 to a focal length of the second lens group G2, and defines distribution of refractive powers between the first lens group and the second lens group G2. In a range equal to or less than the lower limit of <Conditional Expression 3>, a refractive power of the second lens group G2 is weakened and a movement amount of the second lens group G2 during zooming is increased, and in a range equal to or greater than the upper limit of <Conditional Expression 3>, the refractive power of the second lens group G2 is increased and it may be difficult to correct aberration.

The zoom lens system according to exemplary embodiments of the inventive concept may satisfy Conditional Expression 4 below.

$$3.1 < |f_2/f_w| < 3.5 \qquad \text{<Conditional Expression 4>}$$

<Conditional Expression 4> denotes a range of a ratio of a focal length of the second lens group G2 with respect to the entire focal length at the wide-angle end, and in a range equal to or less than the lower limit of <Conditional Expression 4>, a refractive power of the second lens group G2 is increased and it may be difficult to correct aberration, and in a range equal to or greater than the upper limit of <Conditional Expression 4>, the refractive power of the second lens group G2 may be weakened and a movement amount of the second lens group G2 during zooming may be increased.

The first lens group G1 may include three lenses, and focusing may be performed by moving the first lens group G1 along the optical axis. The first lens group G1 may include, in an order from the object side O to the image side I, a first lens L11 having a negative refractive power, a second lens L12 having a negative refractive power, and a third lens L13 having a positive refractive power. The second lens L12 and the third lens L13 may be formed of cemented lenses, and the cemented lenses may contribute to correction of chromatic aberration at the telephoto end.

The zoom lens system according to exemplary embodiments may satisfy Conditional Expressions 5 and 6 below.

$$vd_{12} > 65 \qquad \text{<Conditional Expression 5>}$$

$$Nd_{13}1.90 \qquad \text{<Conditional Expression 6>}$$

Here, $vd_{12}$ denotes an Abbe number of the second lens L12, and $Nd_{13}$ denote a refractive index of the third lens L13 at a d-line. In a range equal to or lower than the lower limit of <Conditional Expression 5>, chromatic aberration may occur at the telephoto end, and in a range equal to or less than the lower limit of <Conditional Expression 6>, curvature of the third lens L13 increases abruptly to cause spherical surface aberration.

The second lens group G2 may include six lenses. The second lens group G2 may include, in an order from the object side O to the image side I, a fourth lens L24, a fifth lens L25, and a sixth lens L26 each having a positive refractive power, and a seventh lens L27 having a negative refractive power, and an eight lens L28 and a ninth lens L29 each having a positive refractive power.

At least one surface of the fourth lens L24 may be an aspherical surface, which may contribute to correction of spherical surface aberration. Also, the fourth lens L24 may satisfy Conditional Expression 7 below.

$$vd_{24} > 60 \qquad \text{<Conditional Expression 7>}$$

Here, $vd_{24}$ denotes an Abbe number of the fourth lens L24. In a range equal to or less than the lower limit of <Conditional Expression 7>, axial chromatic aberration may occur and it may be difficult to correct chromatic aberration in a near infrared range.

The sixth lens L26, the seventh lens L27, and the eighth lens L28 of the second lens group G2 may be formed of triple cemented lenses. The triple cemented lenses contribute to correction of chromatic aberration in a near infrared range, and may satisfy Conditional Expression 8 below.

$$3.5 < |(vd_{28} - vd_{27})|/vd_{26} < 5.0 \qquad \text{<Conditional Expression 8>}$$

Here, $vd_{26}$, $vd_{27}$, and $vd_{28}$ respectively denote Abbe numbers of the sixth lens L26, the seventh lens L27, and the eighth lens L28. In a range equal to or less than the lower limit of <Conditional Expression 8> or in a range equal to or greater than the upper limit of <Conditional Expression 8>, the effect of correcting chromatic aberration according to the triplex cemented lenses is decreased and chromatic aberration may occur in a near infrared range.

In addition, the triplex cemented lenses may satisfy Conditional Expression 9 below.

$$vd_{26} < vd_{27} < vd_{28} \qquad \text{<Conditional Expression 9>}$$

<Conditional Expression 9> denotes relative sizes of Abbe numbers of the sixth lens L26, the seventh lens L27, and the eighth lens L28 sequentially arranged from the object side O to the image side I. When <Conditional Expression 9> is satisfied, chromatic aberration of the zoom lens system may be reduced efficiently.

The ninth lens L29 of the second lens group G2 has a positive refractive power, and at least one surface thereof may be an aspherical surface, and coma aberration that may occur in the periphery region may be corrected using the aspherical surface.

An optical block B2 may be disposed between the second lens group G2 and the image plane IP. The optical block B2 may be, for example, a cover glass CG to protect the image plane IP of the image sensor.

According to the above-described structure, a two-group zoom lens system having a compact size and being capable of correcting chromatic aberration from a visible ray range to a near infrared range so as to be able to capture high resolution images both during the day and also at night may be provided.

Hereinafter, design data of the zoom lens system according to the exemplary embodiments will be described with reference to Tables 1 through 15.

In the design data, f denotes a focal length [mm], Fno denotes an F-number, and a FOV denotes a field of view [°], and R denotes a radius of curvature of each lens surface [mm] (a surface in which the value of R is Infinity indicates that the surface is flat). Dn denotes a distance [mm] between a lens surface and a lens surface on an optical axis, and indicates a thickness of a lens or a distance between lenses. Nd denotes a refractive index of each lens at a d-line, and vd denotes an Abbe number of each lens at the d-line.

An aspherical surface ASP included in the exemplary embodiments is defined by the following equation.

$$z = \frac{ch^2}{1 + \sqrt{1 - (1+K)c^2h^2}} + Ah^4 + Bh^6 + Ch^8 + Dh^{10}$$

An aspherical surface shape included in the zoom lens system according to the exemplary embodiments may be expressed as the above equation when it is assumed that the optical axis direction is a z-axis, a direction perpendicular to the optical axis direction is an h-axis, and the propagating direction of a light ray is positive. Here, z denotes a distance from a vertex of a lens in the optical axis direction, h denotes a distance in the direction perpendicular to the optical axis, K denotes a conic constant, A, B, C, and D denote aspherical surface coefficients, and c denotes the reciprocal (1/R) of the radius of curvature at the vertex of a lens.

First Embodiment

Table 1 shows design data of the zoom lens system according to the exemplary embodiment illustrated FIG. 1. Referring to FIG. 1, Si denotes an i-th surface of a lens when the surface of the first lens L12 towards the object side O is referred to as a first surface S1, and the surface number increases towards the image side I.

TABLE 1

| Surface number | R | Dn | Nd | vd |
|---|---|---|---|---|
| S1 | 18.236 | 0.80 | 2.0010 | 29.1340 |
| S2 | 6.684 | 6.28 | | |
| S3 | −15.926 | 0.65 | 1.5928 | 68.6244 |
| S4 | 15.926 | 1.89 | 2.0027 | 19.3170 |
| S5* | 150.122 | D5 | | |
| S6 | Infinity | 0.21 | 1.5180 | 74.6000 |
| S7(Stop) | Infinity | 0 | | |
| S8 | Infinity | D8 | | |
| S9* | 8.224 | 2.70 | 1.5533 | 71.6846 |
| S10* | 82.322 | 0.15 | | |
| S11 | 8.350 | 3.48 | 1.4370 | 95.1004 |
| S12 | −28.784 | 0.15 | | |
| S13 | 27.905 | 1.54 | 2.1041 | 17.0180 |
| S14 | −44.844 | 0.60 | 2.0006 | 25.4580 |
| S15 | 4.800 | 2.88 | 1.4370 | 95.1004 |
| S16 | −21.523 | 0.15 | | |
| S17* | 10.910 | 2.08 | 2.0017 | 19.3240 |
| S18* | 10.625 | D18 | | |
| S19 | Infinity | 1.3 | 1.5230 | 58.5876 |
| S20 | Infinity | 2.2 | | |
| IP | Infinity | 0 | | |

In above Table 1, * indicates an aspherical surface.

Table 2 shows the aspherical surface coefficients of aspherical surfaces included in the lens system according to the exemplary embodiment illustrated in FIG. 1. In the numbers of the aspherical surface coefficients, the notation 'E−m (m is an integer)' means ×$10^{-m}$.

TABLE 2

| Surface number | Aspherical surface coefficients | | | | |
|---|---|---|---|---|---|
| | K | A | B | C | D |
| S5 | 0 | −3.59E−05 | 3.72E−07 | −1.36E−08 | 4.51E−11 |
| S9 | −0.2738 | −2.14E−05 | −3.11E−06 | 7.31E−08 | −1.43E−09 |
| S10 | 0 | 2.61E−04 | −2.88E−06 | 8.04E−08 | −1.11E−09 |
| S17 | 0.1393 | −9.01E−04 | −7.65E−05 | 5.69E−07 | −1.59E−07 |
| S18 | 0 | −1.07E−03 | −1.09E−04 | 2.01E−06 | 3.14E−08 |

Table 3 shows a focal length f, an F-number (Fno), a field of view FOV, and a variable distance of the zoom lens system according to the exemplary embodiment illustrated in FIG. 1, at a wide-angle end and a telephoto end, respectively.

TABLE 3

| | Wide-angle end | Telephoto end |
|---|---|---|
| F | 2.94 | 11.38 |
| Fno | 1.26 | 3.10 |
| FOV | 70.11 | 16.99 |
| D5 | 13.64 | 3.06 |
| D8 | 10.20 | 0.55 |
| D18 | 1.65 | 11.30 |

Figure 2:
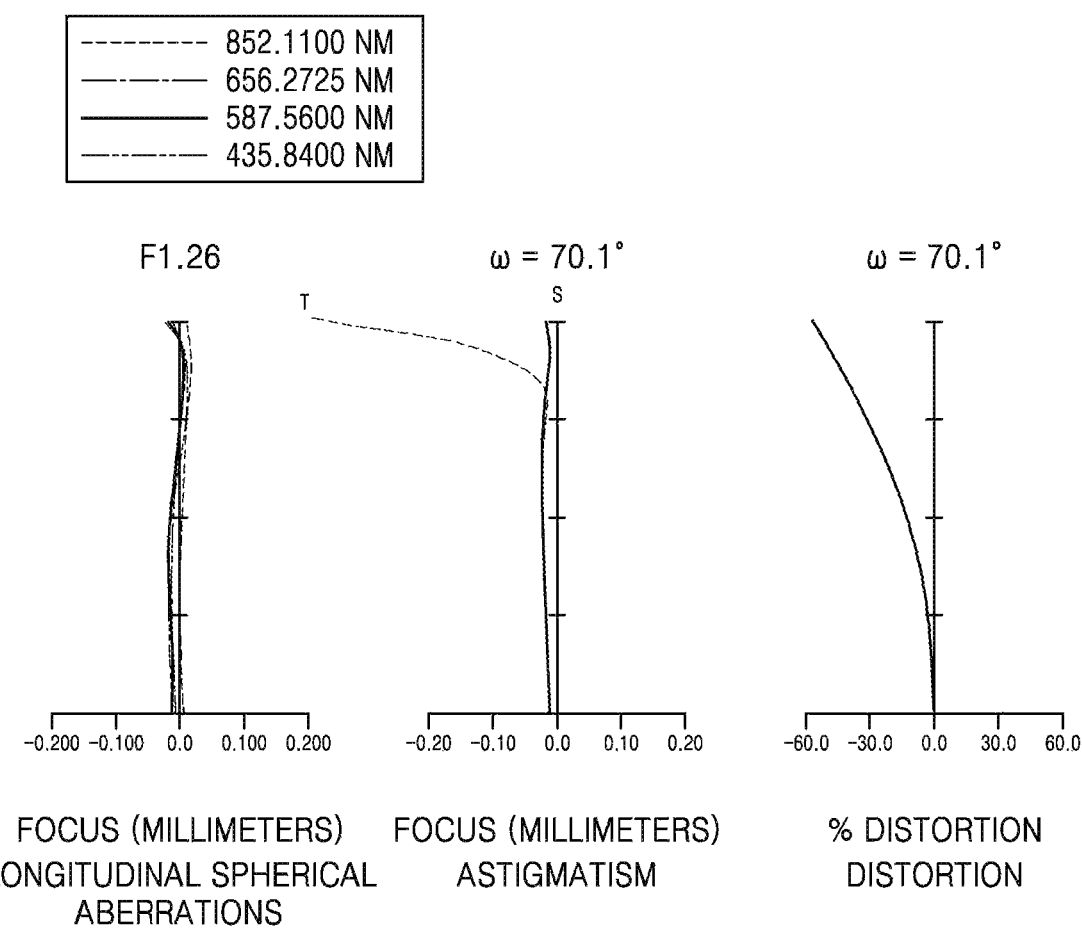
FIG. 2 shows diagrams of longitudinal spherical aberration, astigmatism, and distortion at a wide-angle end of the zoom lens system shown in FIG. 1, according to an exemplary embodiment of the inventive concept.
Figure 3:
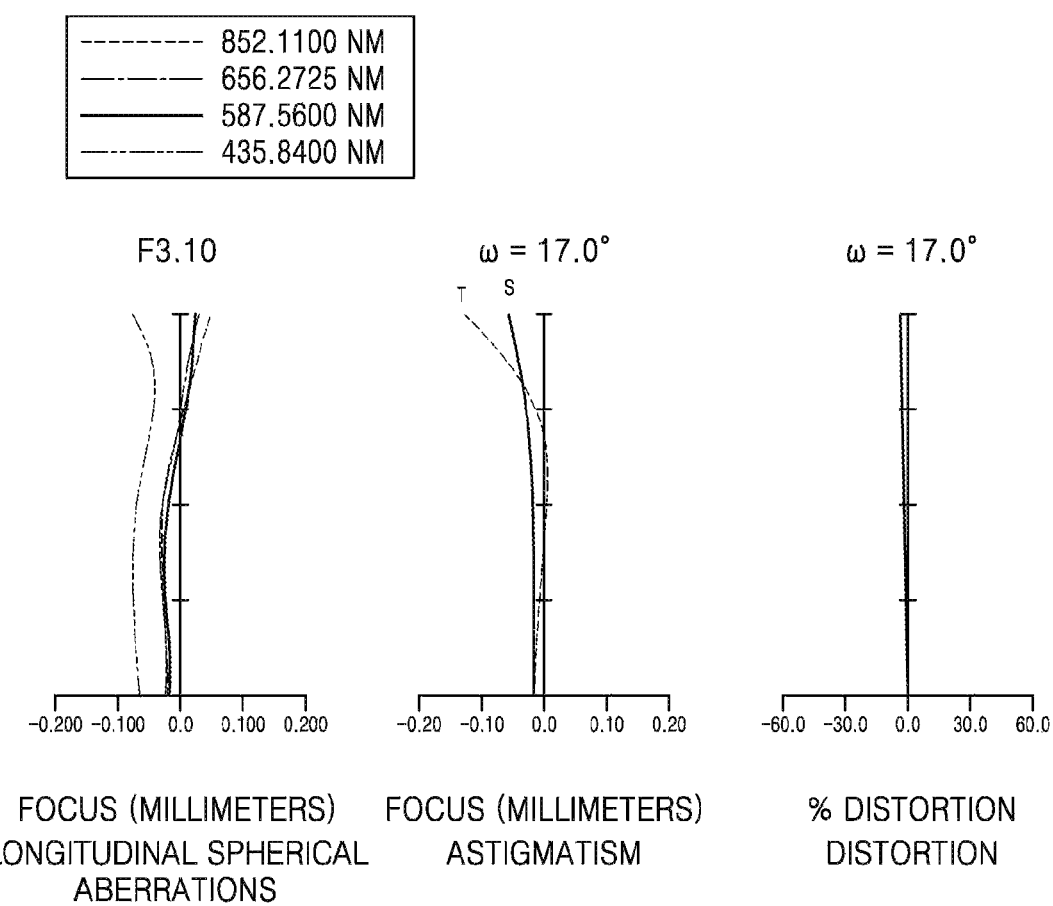
FIG. 3 shows diagrams of longitudinal spherical aberration, astigmatism, and distortion at a telephoto end of the zoom lens system shown in FIG. 1, according to an exemplary embodiment of the inventive concept.

FIG. 2 shows diagrams of longitudinal spherical aberration, astigmatism, and distortion at the wide-angle end of the zoom lens system shown in FIG. 1. FIG. 3 shows diagrams of longitudinal spherical aberration, astigmatism, and distortion at the telephoto end of the zoom lens system shown in FIG. 1.

Longitudinal spherical aberration is shown with respect to light having wavelengths of about 852.1100 nm (s-line), about 656.2725 nm (c-line), 587.5600 nm (d-line), and 486.1300 nm (f-line), and astigmatism and distortion are shown with respect to light having a wavelength of about 587.5600 nm (d-line). In an astigmatism graph, a dotted line denotes tangential astigmatism, and a solid line denotes sagittal astigmatism.

Second Embodiment

Figure 4:
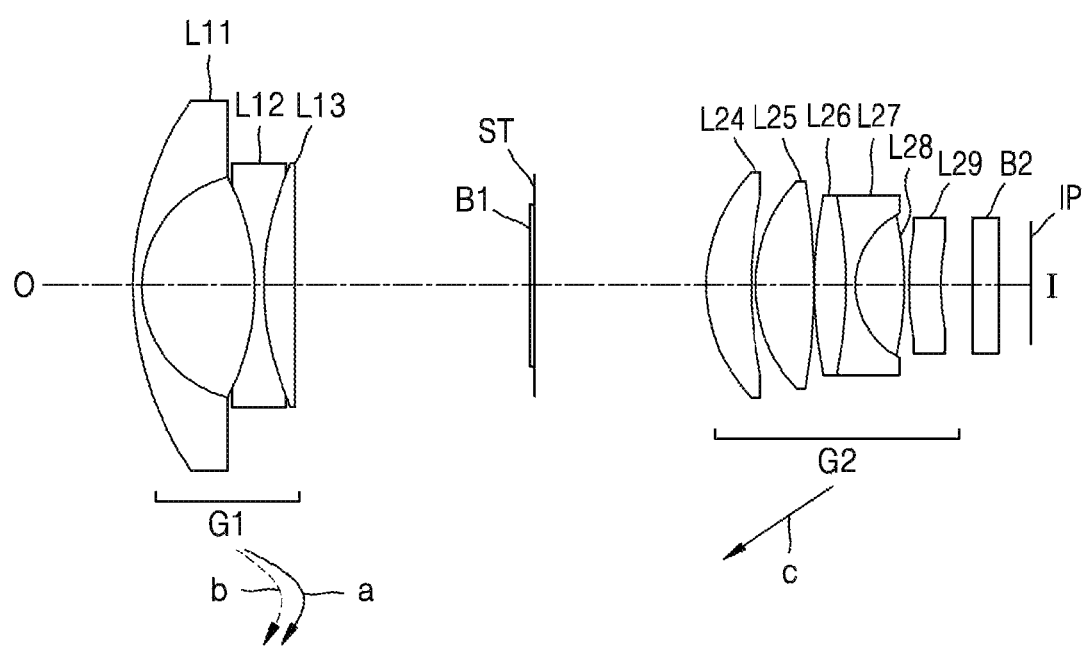
FIG. 4 illustrates an optical layout of a zoom lens system, according to another exemplary embodiment of the inventive concept.

Table 4 shows design data of the zoom lens system according to the exemplary embodiment shown in FIG. 4.

TABLE 4

| Surface number | R | Dn | Nd | vd |
|---|---|---|---|---|
| S1 | 17.489 | 0.80 | 2.0010 | 29.1340 |
| S2 | 6.651 | 6.28 | | |
| S3 | −17.055 | 0.60 | 1.5928 | 68.6244 |
| S4 | 13.982 | 2.34 | 2.0017 | 19.3240 |
| S5* | 70.048 | D5 | | |
| S6 | Infinity | 0.21 | 1.5180 | 74.6000 |
| S7(Stop) | Infinity | 0 | | |
| S8 | Infinity | D8 | | |
| S9* | 8.091 | 3.09 | 1.5533 | 71.6846 |
| S10* | 550.000 | 0.15 | | |
| S11 | 8.836 | 3.52 | 1.4370 | 95.1004 |
| S12 | −25.468 | 0.20 | | |
| S13 | 47.860 | 1.55 | 2.1041 | 17.0180 |
| S14 | −26.213 | 0.60 | 2.0006 | 25.4580 |
| S15 | 4.550 | 2.68 | 1.4370 | 95.1004 |
| S16 | 86.028 | 0.15 | | |
| S17* | 5.857 | 2.08 | 1.6889 | 31.1605 |

TABLE 4-continued

| Surface number | R | Dn | Nd | vd |
|---|---|---|---|---|
| S18* | 9.006 | D18 | | |
| S19 | Infinity | 1.3 | 1.5230 | 58.5876 |
| S20 | Infinity | 2.2 | | |
| IP | Infinity | 0 | | |

In above Table 4, * indicates an aspherical surface.

Table 5 shows the aspherical surface coefficients of aspherical surfaces included in the zoom lens system according to the exemplary embodiment shown in FIG. 4. In the numbers of the aspherical surface coefficients, the notation 'E−m (m is an integer)' means×$10^{-m}$.

TABLE 5

| Surface number | Aspherical surface coefficients | | | | |
|---|---|---|---|---|---|
| | K | A | B | C | D |
| S5 | 0 | −3.07E−05 | 1.11E−07 | −4.82E−09 | −1.53E−10 |
| S9 | −0.6403 | −6.34E−05 | −6.02E−07 | 1.05E−09 | −3.67E−10 |
| S10 | 0 | 7.01E−05 | 9.64E−08 | −1.61E−09 | −8.88E−11 |
| S17 | −0.4246 | −1.35E−04 | −3.70E−05 | −9.13E−07 | −1.23E−07 |
| S18 | 0 | 1.63E−04 | −2.88E−05 | −7.71E−06 | 2.12E−07 |

Table 6 shows a focal length f, an F-number (Fno), a field of view FOV, and a variable distance of the zoom lens system according to the exemplary embodiment illustrated in FIG. 4, at a wide-angle end and a telephoto end, respectively.

TABLE 6

| | Wide-angle end | Telephoto end |
|---|---|---|
| f | 2.94 | 11.38 |
| Fno | 1.26 | 3.11 |
| FOV | 69.80 | 17.04 |
| D5 | 13.54 | 3.15 |
| D8 | 10.60 | 0.55 |
| D18 | 1.65 | 11.70 |

Figure 5:
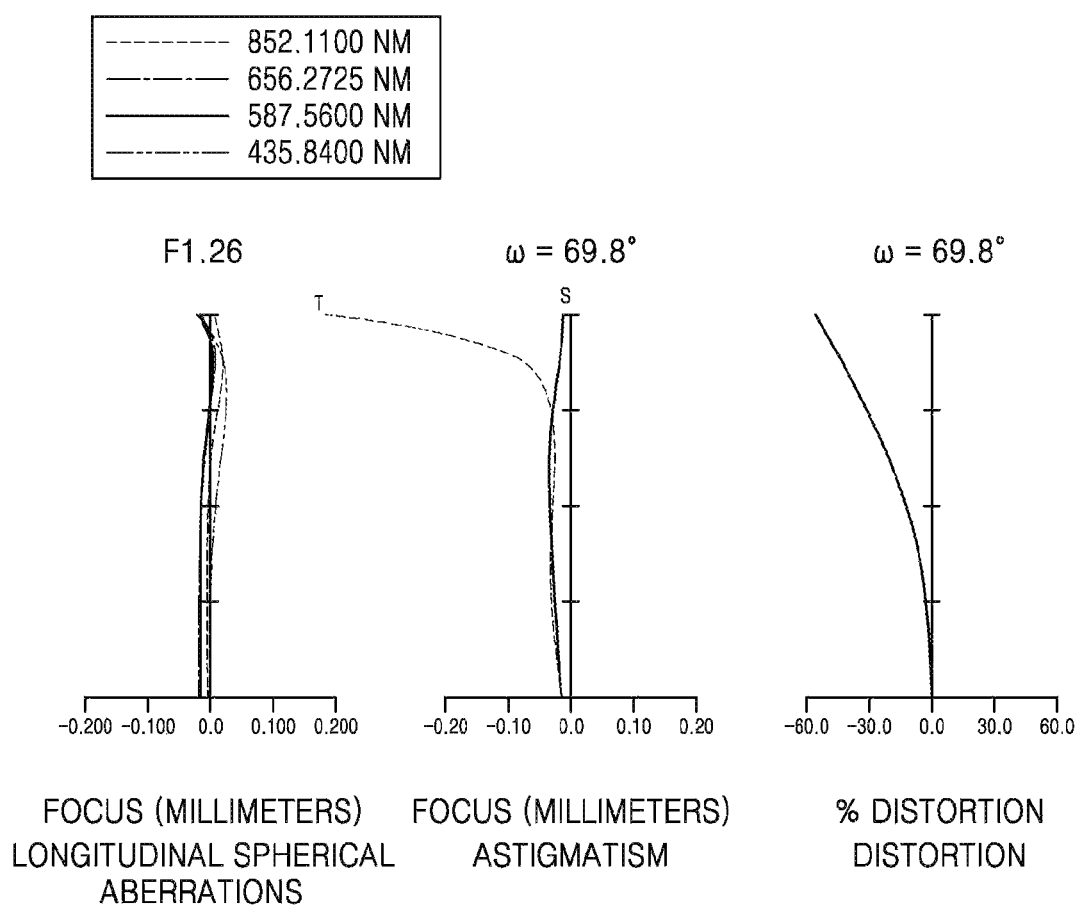
FIG. 5 shows diagrams of longitudinal spherical aberration, astigmatism, and distortion at a wide-angle end of the zoom lens system shown in FIG. 4, according to an exemplary embodiment of the inventive concept.
Figure 6:
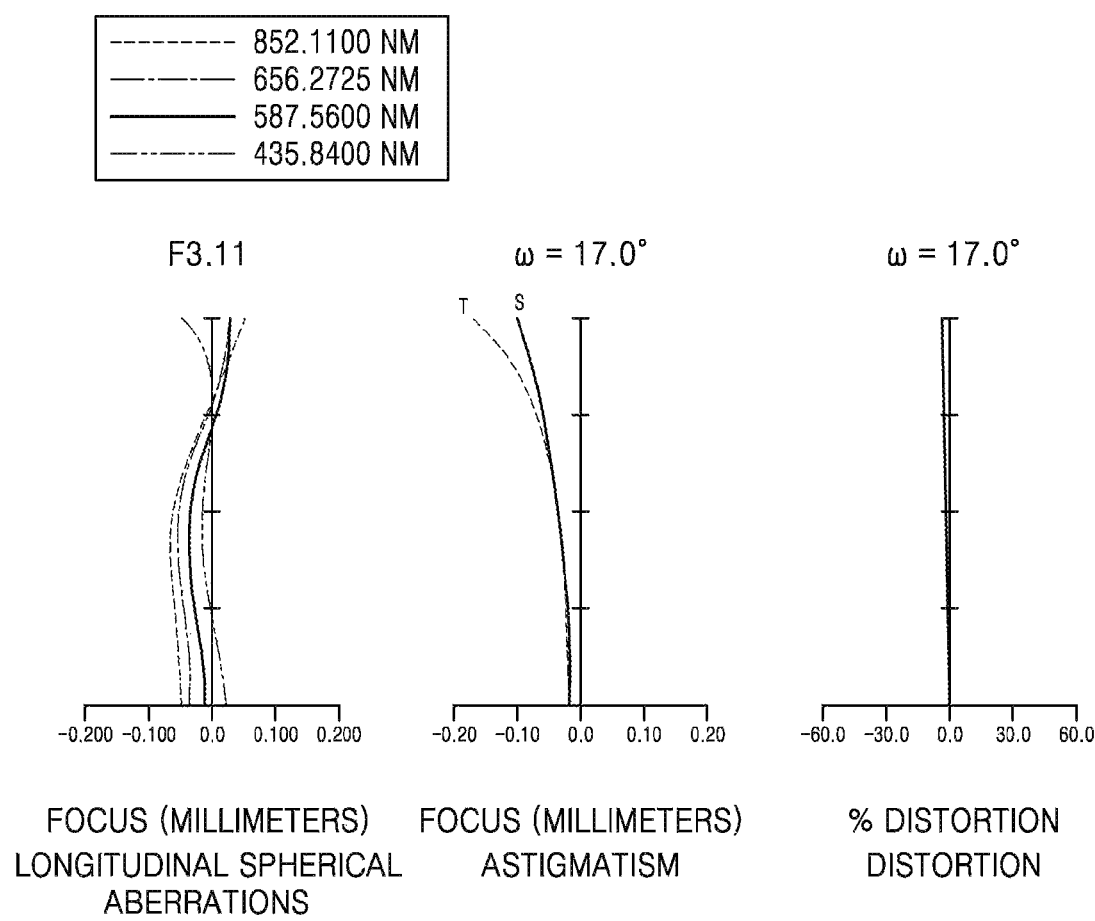
FIG. 6 shows diagrams of longitudinal spherical aberration, astigmatism, and distortion at a telephoto end of the zoom lens system shown in FIG. 4, according to an exemplary embodiment of the inventive concept.

FIG. 5 shows diagrams of longitudinal spherical aberration, astigmatism, and distortion at the wide-angle end of the zoom lens system shown in FIG. 4. FIG. 6 shows diagrams of longitudinal spherical aberration, astigmatism, and distortion at the telephoto end of the zoom lens system shown in FIG. 4.

Longitudinal spherical aberration is shown with respect to light having wavelengths of about 852.1100 nm(s-line), about 656.2725 nm (c-line), 587.5600 nm (d-line), and 486.1300 nm (f-line), and astigmatism and distortion are shown with respect to light having a wavelength of about 587.5600 nm (d-line). In an astigmatism graph, a dotted line denotes tangential astigmatism, and a solid line denotes sagittal astigmatism.

Third Embodiment

Figure 7:
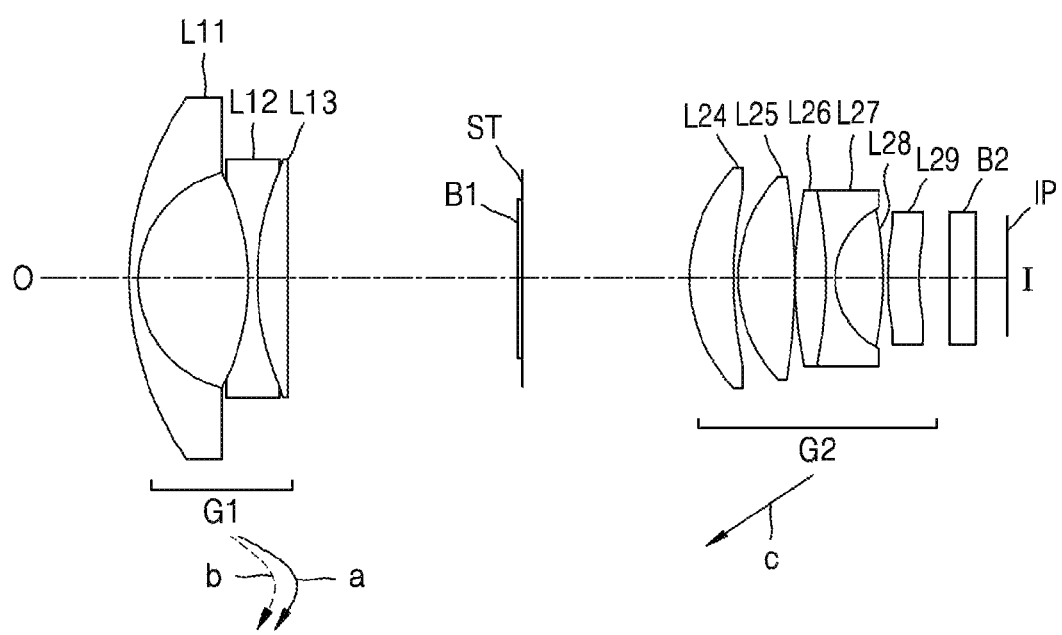
FIG. 7 illustrates an optical layout of a zoom lens system, according to another exemplary embodiment of the inventive concept.

Table 7 shows design data of the zoom lens system according to the exemplary embodiment shown in FIG. 7.

TABLE 7

| Surface number | R | Dn | Nd | vd |
|---|---|---|---|---|
| S1 | 37.368 | 0.80 | 1.9537 | 32.3188 |
| S2 | 7.200 | 5.59 | | |
| S3 | −16.000 | 0.60 | 1.4875 | 70.4412 |
| S4 | 16.775 | 2.30 | 2.0017 | 19.3240 |
| S5* | 146.480 | D5 | | |
| S6 | Infinity | 0.21 | 1.5180 | 74.6000 |
| S7(Stop) | Infinity | 0 | | |
| S8 | Infinity | D8 | | |
| S9* | 7.687 | 2.70 | 1.5920 | 67.0227 |
| S10* | 67.948 | 0.15 | | |
| S11 | 9.476 | 3.48 | 1.4370 | 95.1004 |
| S12 | −22.861 | 0.15 | | |
| S13 | 37.551 | 1.54 | 2.1041 | 17.0180 |
| S14 | −56.396 | 0.60 | 2.0006 | 25.4580 |
| S15 | 4.550 | 2.88 | 1.4370 | 95.1004 |
| S16 | 25.230 | 0.15 | | |
| S17* | 6.500 | 2.08 | 1.6889 | 31.1605 |
| S18* | 12.050 | D18 | | |
| S19 | Infinity | 1.3 | 1.5230 | 58.5876 |
| S20 | Infinity | 2.2 | | |
| IP | Infinity | 0 | | |

In above Table 7, * indicates an aspherical surface.

Table 8 shows the aspherical surface coefficients of aspherical surfaces included in the zoom lens system according to the exemplary embodiment shown in FIG. 7. In the numbers of the aspherical surface coefficients, the notation 'E−m (m is an integer)' means×$10^{-m}$.

TABLE 8

| Surface number | Aspherical surface coefficients | | | | |
|---|---|---|---|---|---|
| | K | A | B | C | D |
| S5 | 0 | −2.54E−05 | 6.08E−07 | −2.73E−08 | 2.46E−10 |
| S9 | −0.7357 | 1.31E−05 | −1.13E−06 | 1.15E−08 | 7.56E−11 |
| S10 | 0 | 1.30E−04 | −2.15E−06 | 6.79E−08 | −2.58E−10 |

TABLE 8-continued

| Surface number | Aspherical surface coefficients | | | | |
|---|---|---|---|---|---|
| | K | A | B | C | D |
| S17 | −0.7895 | −1.36E−04 | −5.91E−05 | 2.32E−08 | −9.73E−08 |
| S18 | 0 | 1.26E−04 | −8.57E−05 | −1.23E−06 | 8.76E−08 |

Table 9 shows a focal length f, an F-number (Fno), a field of view FOV, and a variable distance of the zoom lens system according to the exemplary embodiment illustrated in FIG. 7, at a wide-angle end and a telephoto end, respectively.

TABLE 9

| | Wide-angle end | Telephoto end |
|---|---|---|
| f | 2.94 | 11.39 |
| Fno | 1.26 | 3.01 |
| FOV | 76.83 | 17.03 |
| D5 | 14.89 | 2.93 |
| D8 | 10.24 | 0.55 |
| D18 | 1.65 | 11.34 |

Figure 8:
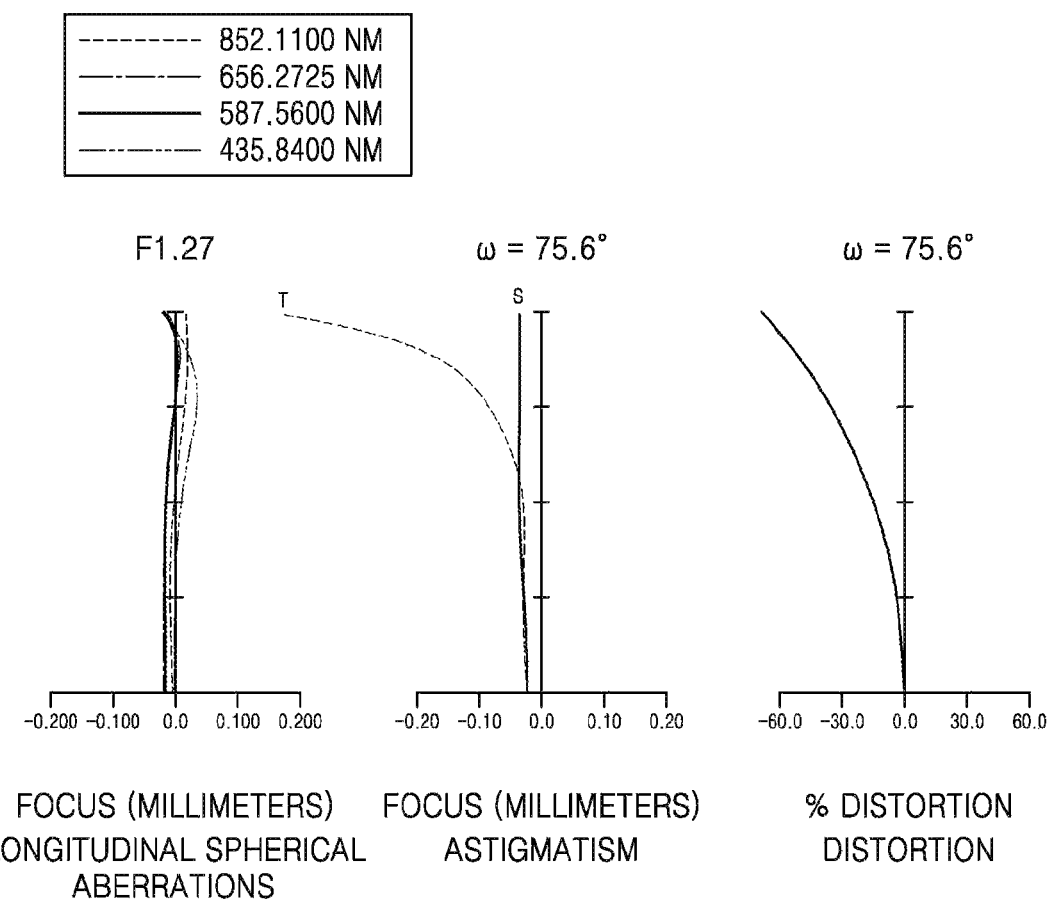
FIG. 8 shows diagrams of longitudinal spherical aberration, astigmatism, and distortion at a wide-angle end of the zoom lens system shown in FIG. 7, according to an exemplary embodiment of the inventive concept.
Figure 9:
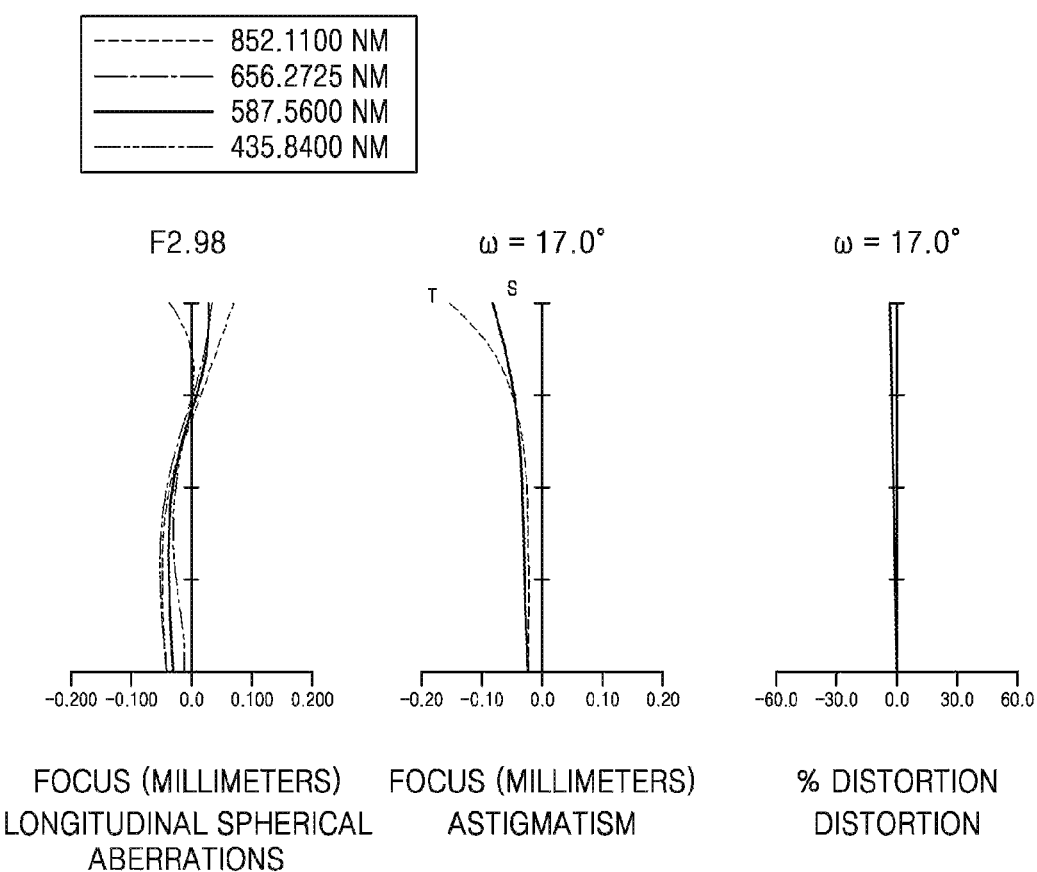
FIG. 9 shows diagrams of longitudinal spherical aberration, astigmatism, and distortion at a telephoto end of the zoom lens system shown in FIG. 7, according to an exemplary embodiment of the inventive concept.

FIG. 8 shows diagrams of longitudinal spherical aberration, astigmatism, and distortion at the wide-angle end of the zoom lens system shown in FIG. 7. FIG. 9 shows diagrams of longitudinal spherical aberration, astigmatism, and distortion at the telephoto end of the zoom lens system shown in FIG. 7.

Longitudinal spherical aberration is shown with respect to light having wavelengths of about 852.1100 nm(s-line), about 656.2725 nm (c-line), 587.5600 nm (d-line), and 486.1300 nm (f-line), and astigmatism and distortion are shown with respect to light having a wavelength of about 587.5600 nm (d-line). In an astigmatism graph, a dotted line denotes tangential astigmatism, and a solid line denotes sagittal astigmatism.

Fourth Embodiment

Figure 10:
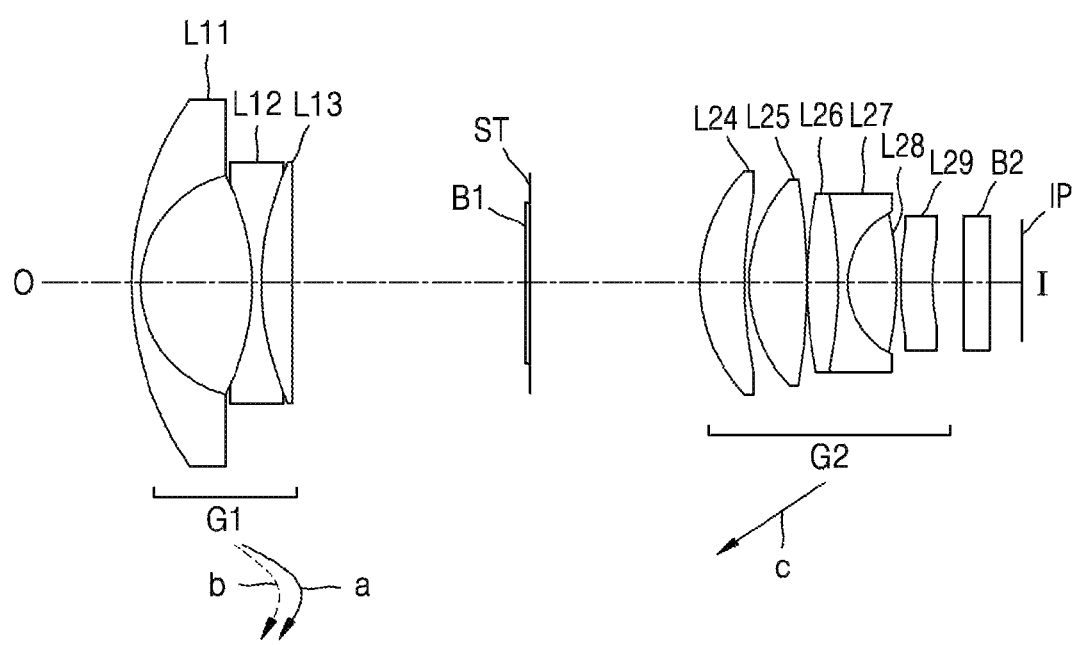
FIG. 10 illustrates an optical layout of a zoom lens system, according to another exemplary embodiment of the inventive concept.

Table 10 shows design data of the zoom lens system according to the exemplary embodiment shown in FIG. 10.

TABLE 10

| Surface number | R | Dn | Nd | vd |
|---|---|---|---|---|
| S1 | 32.300 | 0.80 | 1.9537 | 32.3188 |
| S2 | 7.000 | 5.65 | | |
| S3 | −16.150 | 0.60 | 1.4875 | 70.4412 |
| S4 | 12.582 | 2.35 | 2.0170 | 20.8300 |
| S5* | 46.617 | D5 | | |
| S6 | Infinity | 0.21 | 1.5180 | 74.6000 |
| S7(Stop) | Infinity | 0 | | |
| S8 | Infinity | D8 | | |
| S9* | 9.049 | 3.09 | 1.5995 | 65.5733 |
| S10* | −84.833 | 0.15 | | |
| S11 | 8.719 | 4.13 | 1.4370 | 95.1004 |
| S12 | −18.829 | 0.15 | | |
| S13 | Infinity | 1.46 | 2.1041 | 17.0180 |
| S14 | −17.754 | 0.60 | 2.0006 | 25.4580 |
| S15 | 4.550 | 2.23 | 1.4370 | 95.1004 |
| S16 | 18.360 | 0.15 | | |
| S17* | 6.218 | 2.26 | 1.6889 | 31.081 |
| S18* | 17.500 | D18 | | |
| S19 | Infinity | 1.3 | 1.5230 | 58.5876 |
| S20 | Infinity | 2.2 | | |
| IP | Infinity | 0 | | |

In above Table 10, * indicates an aspherical surface.

Table 11 shows the aspherical surface coefficients of aspherical surfaces included in the zoom lens system according to the exemplary embodiment shown in FIG. 10. In the numbers of the aspherical surface coefficients, the notation 'E−m (m is an integer)' means×$10^{-m}$.

TABLE 11

| Surface number | Aspherical surface coefficients | | | | |
|---|---|---|---|---|---|
| | K | A | B | C | D |
| S5 | 0 | −8.41E−06 | 8.38E−07 | −3.41E−08 | 3.59E−10 |
| S9 | −0.8946 | −3.25E−05 | −9.55E−07 | −2.63E−08 | 3.52E−10 |
| S10 | 0 | 3.58E−05 | −9.84E−07 | 2.05E−09 | 4.60E−10 |
| S17 | 0.8496 | −9.27E−04 | −6.08E−05 | −7.52E−07 | −9.73E−08 |
| S18 | 0 | 2.25E−04 | −4.56E−05 | −2.15E−06 | 8.76E−08 |

Table 12 shows a focal length f, an F-number (Fno), a field of view FOV, and a variable distance of the zoom lens system according to the exemplary embodiment illustrated in FIG. 10, at a wide-angle end and a telephoto end, respectively.

TABLE 12

| | Wide-angle end | Telephoto end |
|---|---|---|
| f | 2.94 | 11.40 |
| Fno | 1.27 | 3.12 |
| FOV | 76.85 | 17.08 |
| D5 | 13.76 | 3.41 |
| D8 | 10.76 | 0.35 |
| D18 | 1.65 | 12.06 |

Figure 11:
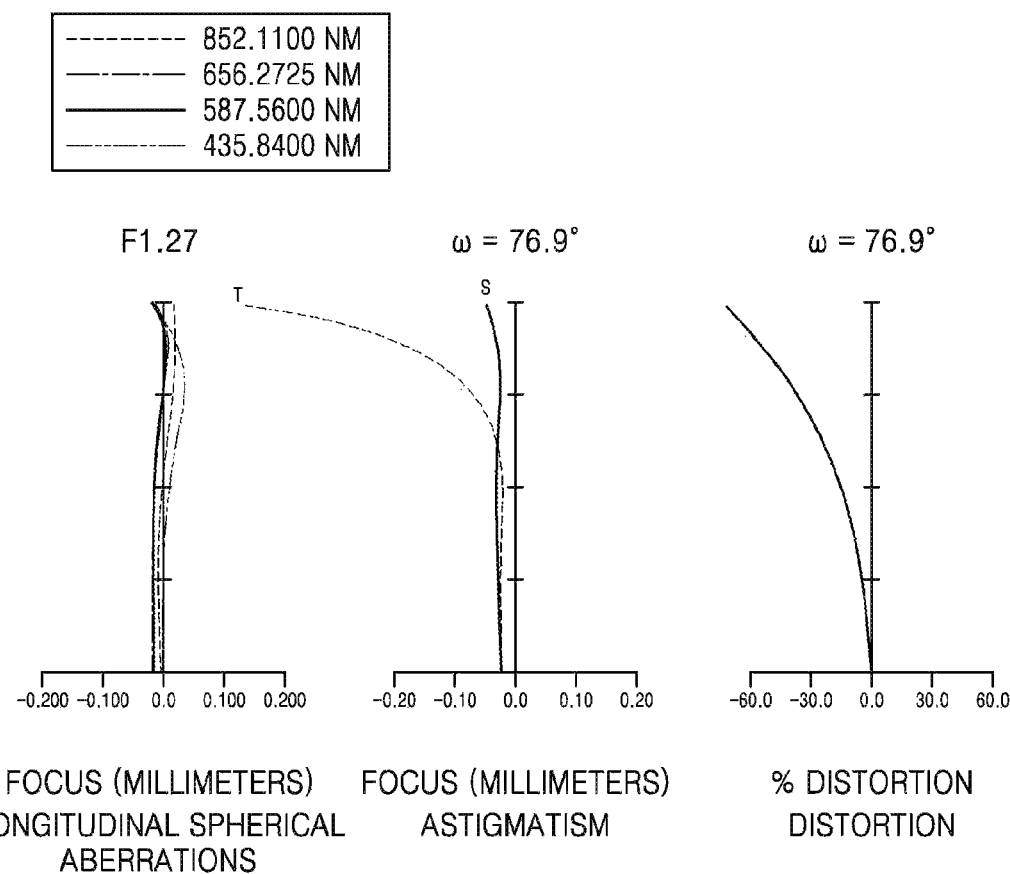
FIG. 11 shows diagrams of longitudinal spherical aberration, astigmatism, and distortion at a wide-angle end of the zoom lens system shown in FIG. 10, according to an exemplary embodiment of the inventive concept.
Figure 12:
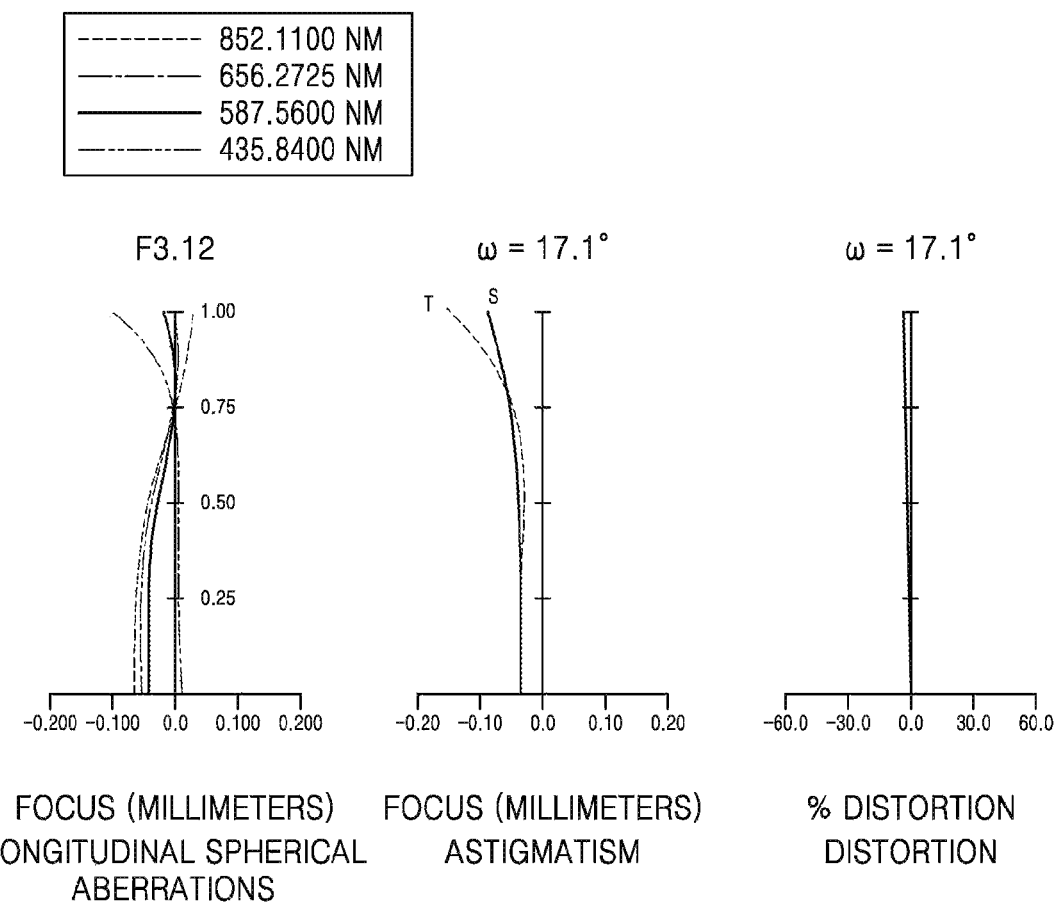
FIG. 12 shows diagrams of longitudinal spherical aberration, astigmatism, and distortion at a telephoto end of the zoom lens system shown in FIG. 10, according to an exemplary embodiment of the inventive concept.

FIG. 11 shows diagrams of longitudinal spherical aberration, astigmatism, and distortion at the wide-angle end of the zoom lens system shown in FIG. 10. FIG. 12 shows diagrams of longitudinal spherical aberration, astigmatism, and distortion at the telephoto end of the zoom lens system shown in FIG. 10.

Longitudinal spherical aberration is shown with respect to light having wavelengths of about 852.1100 nm (s-line), about 656.2725 nm (c-line), 587.5600 nm (d-line), and 486.1300 nm (f-line), and astigmatism and distortion are shown with respect to light having a wavelength of about 587.5600 nm (d-line). In an astigmatism graph, a dotted line denotes tangential astigmatism, and a solid line denotes sagittal astigmatism.

Fifth Embodiment

Figure 13:
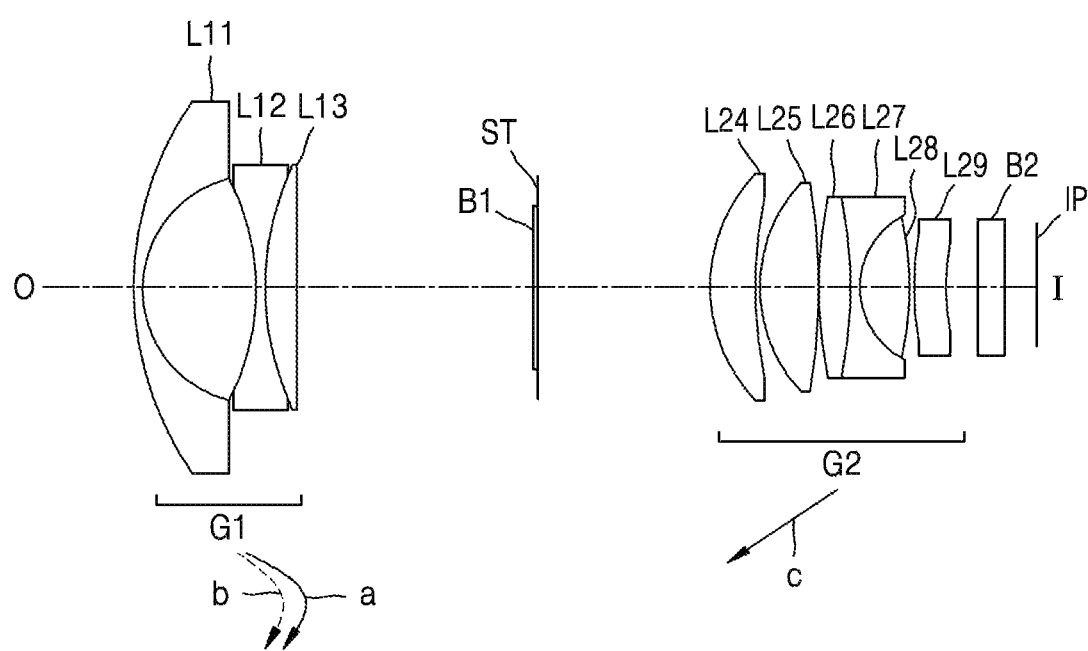
FIG. 13 illustrates an optical layout of a zoom lens system, according to another exemplary embodiment of the inventive concept.

Table 13 shows design data of the zoom lens system according to the exemplary embodiment shown in FIG. 13.

TABLE 13

| Surface number | R | Dn | Nd | vd |
|---|---|---|---|---|
| S1 | 35.426 | 0.85 | 1.9537 | 32.3188 |
| S2 | 7.040 | 5.65 | | |
| S3 | −16.000 | 0.60 | 1.4875 | 70.4412 |
| S4 | 14.592 | 2.21 | 2.0017 | 19.3240 |
| S5* | 71.400 | D5 | | |
| S6 | Infinity | 0.21 | 1.5180 | 74.6000 |
| S7(Stop) | Infinity | 0 | | |
| S8 | Infinity | D8 | | |
| S9* | 8.030 | 3.36 | 1.5533 | 71.6846 |
| S10* | −90.120 | 0.15 | | |
| S11 | 10.539 | 3.67 | 1.4370 | 95.1004 |
| S12 | −22.715 | 0.15 | | |
| S13 | 49.937 | 1.42 | 2.1041 | 17.0180 |
| S14 | −38.286 | 0.70 | 2.0006 | 25.4580 |
| S15 | 4.550 | 2.37 | 1.4370 | 95.1004 |
| S16 | 21.443 | 0.15 | | |
| S17* | 7.000 | 2.51 | 1.6889 | 31.1605 |
| S18* | 17.500 | D18 | | |
| S19 | Infinity | 1.1 | 1.5230 | 58.5876 |
| S20 | Infinity | 2.4 | | |
| IP | Infinity | 0 | | |

In above Table 13, * indicates an aspherical surface.

Table 14 shows the aspherical surface coefficients of aspherical surfaces included in the zoom lens system according to the exemplary embodiment shown in FIG. 13. In the numbers of the aspherical surface coefficients, the notation 'E−m (m is an integer)' means×$10^{-m}$.

TABLE 14

| Surface number | Aspherical surface coefficients | | | | |
|---|---|---|---|---|---|
| | K | A | B | C | D |
| S5 | 0 | −2.02E−05 | 6.35E−07 | −3.00E−08 | 3.07E−10 |
| S9 | −0.7914 | −2.58E−05 | −8.64E−07 | 1.58E−08 | −4.23E−10 |
| S10 | 0 | 1.12E−04 | −1.38E−06 | 3.76E−08 | −4.97E−10 |
| S17 | 1.3942 | −8.49E−04 | −4.95E−05 | −1.36E−06 | −7.65E−08 |
| S18 | 0 | 4.04E−05 | −2.88E−05 | −3.65E−06 | 1.48E−07 |

Table 15 shows a focal length f, an F-number (Fno), a field of view FOV, and a variable distance of the zoom lens system according to the exemplary embodiment illustrated in FIG. 13, at a wide-angle end and a telephoto end, respectively.

TABLE 15

| | Wide-angle end | Telephoto end |
|---|---|---|
| f | 2.94 | 11.40 |
| Fno | 1.27 | 3.14 |
| FOV | 77.43 | 17.07 |
| D5 | 13.97 | 3.41 |
| D8 | 10.90 | 0.40 |
| D18 | 1.65 | 12.15 |

Figure 14:
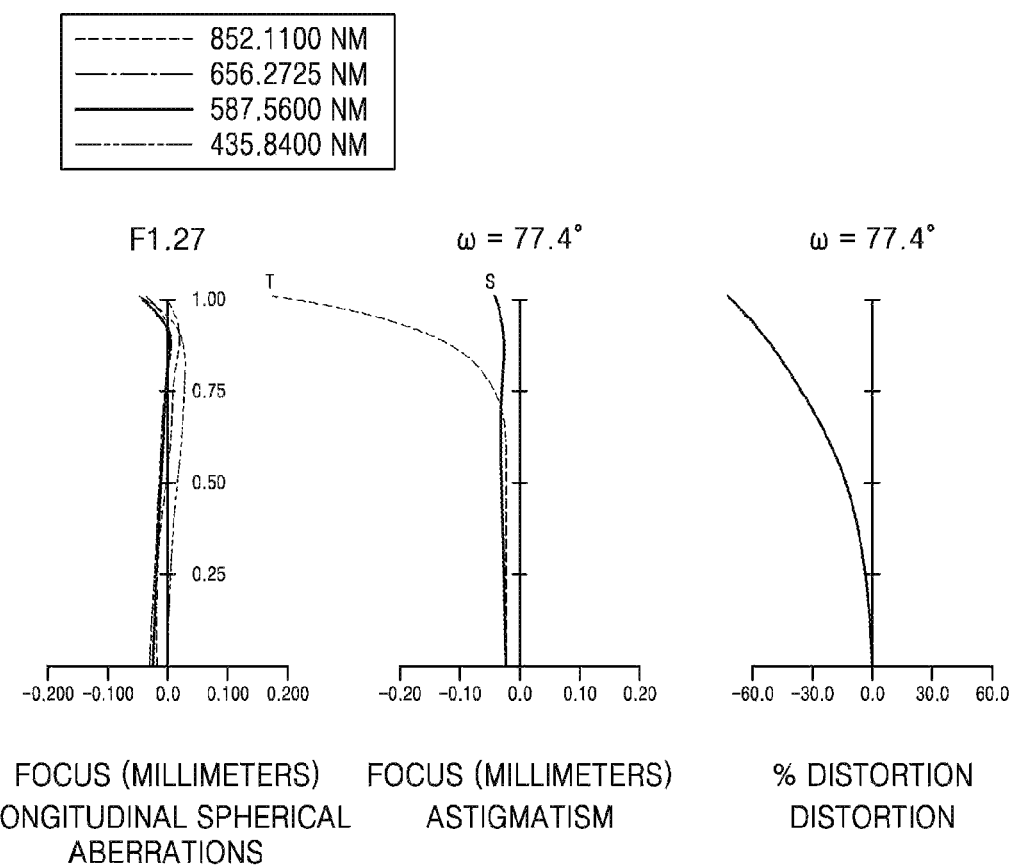
FIG. 14 shows diagrams of longitudinal spherical aberration, astigmatism, and distortion at a wide-angle end of the zoom lens system shown in FIG. 13, according to an exemplary embodiment of the inventive concept.
Figure 15:
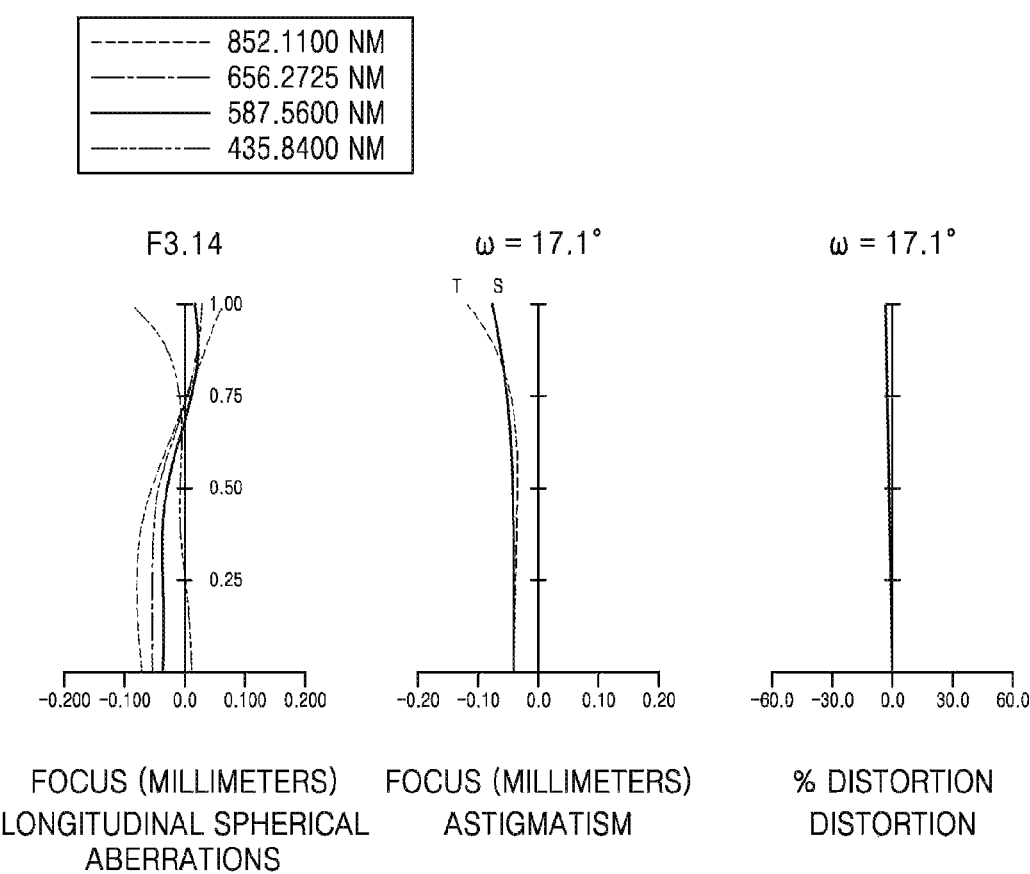
FIG. 15 shows diagrams of longitudinal spherical aberration, astigmatism, and distortion at a telephoto end of the zoom lens system shown in FIG. 13, according to an exemplary embodiment of the inventive concept.

FIG. 14 shows diagrams of longitudinal spherical aberration, astigmatism, and distortion at the wide-angle end of the zoom lens system shown in FIG. 13. FIG. 15 shows diagrams of longitudinal spherical aberration, astigmatism, and distortion at the telephoto end of the zoom lens system shown in FIG. 13.

Longitudinal spherical aberration is shown with respect to light having wavelengths of about 852.1100 nm(s-line), about 656.2725 nm (c-line), 587.5600 nm (d-line), and 486.1300 nm (f-line), and astigmatism and distortion are shown with respect to light having a wavelength of about 587.5600 nm (d-line). In an astigmatism graph, a dotted line denotes tangential astigmatism, and a solid line denotes sagittal astigmatism.

Table 16 below shows that the zoom lens system according to the exemplary embodiments satisfies <Conditional Expressions 1 through 4 and 8>.

TABLE 16

| Conditional Expression | Conditional Expression 1 | Conditional Expression 2 | Conditional Expression 3 | Conditional Expression 4 | Conditional Expression 8 |
|---|---|---|---|---|---|
| First embodiment | 3.987 | 2.852 | 0.876 | 3.256 | 4.092 |
| Second embodiment | 2.031 | 2.808 | 0.840 | 3.343 | 4.092 |
| Third embodiment | 4.064 | 2.943 | 0.873 | 3.370 | 4.092 |
| Fourth embodiment | 4.063 | 2.779 | 0.812 | 3.424 | 4.092 |
| Fifth embodiment | 4.098 | 2.790 | 0.806 | 3.461 | 4.092 |

According to the exemplary embodiments, a two-group zoom lens system having a compact size and being capable correcting aberrations from a visible ray range to a near infrared range so as to be able to capture high-resolution images both during the day and also at night may be implemented.

In addition, a zoom lens system having a compact size and high optical performance may be provided.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the drawings, it will be understood by those of ordinary skill in the art that various changes in form and details may be made therein without departing from the spirit and scope of the inventive concept as defined by the following claims.

What is claimed is:

1. A zoom lens system comprising:
a first lens group having a negative refractive power;
a second lens group having a positive refractive power; and
an aperture disposed between the first lens group and the second lens group,
wherein the first lens group and the second lens group are sequentially arranged from an object side to an image side,
wherein the zoom lens system is configured to perform zooming by moving the second lens group along an optical axis, and perform focusing by moving the first lens group along the optical axis, and
wherein the zoom lens system satisfies a conditional expression below:

$2.5<(f_w/f_1) \times (T_w/Y)<4.5$, where $f_w$ denotes an entire focal length at a wide-angle end, $f_t$ denotes an entire focal length at a telephoto end, and Tw denotes a distance between an image plane and an object side lens surface of a lens that is closest to the object side of the first lens group at the wide-angle end, and Y denotes a radical axis image height.

2. The zoom lens system of claim 1, wherein the zoom lens system satisfies conditional expressions below:

$2.5<|f_1/f_w|<3.0$, $0.8<|f_1/f_2|<1.0$, and $3.1<|f_2/f_w|<3.5$, where $f_1$ denotes a focal length of the first lens group, and $f_2$ denotes a focal length of the second lens group.

3. The zoom lens system of claim 1, wherein the first lens group comprises:
a first lens having a negative refractive power;
a second lens having a negative refractive power; and
a third lens having a positive refractive power,
wherein the first lens, the second lens, and the third lens are sequentially arranged from the object side to the image side.

4. The zoom lens system of claim 3, wherein the second lens and the third lens are cemented lenses.

5. The zoom lens system of claim 4, wherein the zoom lens system satisfies a conditional expressions below:

$vd_{12}>65$, and $Nd_{13}>1.90$, where $vd_{12}$ denotes an Abbe number of the second lens, and $Nd_{13}$ denotes a refractive index of the third lens at a d-line.

6. The zoom lens system of claim 1, wherein the second lens group comprises:
a fourth lens, a fifth lens, and a sixth lens each having a positive refractive power;
a seventh lens having a negative refractive power; and
an eighth lens and a ninth lens each having a positive refractive power,
wherein the fourth lens, the fifth lens, the sixth lens, the seventh lens and the eighth lens are sequentially arranged from the object side to the image side.

7. The zoom lens system of claim 6, wherein the fourth lens comprises at least one aspherical lens,
wherein the zoom lens system satisfies a conditional expression below:

$vd_{24}>60$, where $vd_{24}$ denotes an Abbe number of the fourth lens.

8. The zoom lens system of claim 6, wherein the sixth lens, the seventh lens, and the eighth lens are triple cemented lenses.

9. The zoom lens system of claim 8, wherein the zoom lens system satisfies a conditional expression below:

$3.5<|(vd_{28}-vd_{27})|/vd_{26}<5.0$, where $vd_{26}$, $vd_{27}$, and $vd_{28}$ respectively denote Abbe numbers of the sixth lens, the seventh lens, and the eighth lens.

10. The zoom lens system of claim 8, wherein the zoom lens system satisfies a conditional expression below:

$vd_{26}<vd_{27}<vd_{28}$, where $vd_{26}$, $vd_{27}$, and $vd_{28}$ respectively denote Abbe numbers of the sixth lens, the seventh lens, and the eighth lens.

11. The zoom lens system of claim 1, further comprising a near infrared light blocking filter between the first lens group and the second lens group.

12. A zoom lens system comprising:
a first lens group having a negative refractive power;
a second lens group having a positive refractive power; and
an aperture disposed between the first lens group and the second lens group,
wherein the first lens group and the second lens group are sequentially arranged from an object side to an image side,
wherein the zoom lens system is configured to perform zooming by moving the second lens group along an optical axis and perform focusing by moving the first lens group along the optical axis,
wherein the second lens group comprises:
a fourth lens, a fifth lens, and a sixth lens each having a positive refractive power;
a seventh lens having a negative refractive power; and
an eighth lens and a ninth lens each having a positive refractive power,
wherein the fourth lens, the fifth lens, the sixth lens, the seventh lens and the eighth lens are sequentially arranged from the object side to the image side,
wherein the zoom lens system satisfies a conditional expression below:

$$3.5<|(vd_{28}-vd_{27})|/vd_{26}<5.0,$$

where $vd_{26}$, $vd_{27}$, and $vd_{28}$ respectively denote Abbe numbers of the sixth lens, the seventh lens, and the eighth lens.

13. The zoom lens system of claim 12, wherein the sixth lens, the seventh lens, and the eighth lens are cemented lenses.

14. The zoom lens system of claim 13, wherein the zoom lens system satisfies a conditional expression below:

$$vd_{26}<vd_{27}<vd_{28},$$

where $vd_{26}$, $vd_{27}$, and $vd_{28}$ respectively denote Abbe numbers of the sixth lens, the seventh lens, and the eighth lens.

15. The zoom lens system of claim 12, wherein the fourth lens comprises at least one aspherical lens, and wherein the zoom lens system satisfies a conditional expression below:

$$vd_{24}>60,$$

where $vd_{24}$ denotes an Abbe number of the fourth lens.

16. The zoom lens system of claim 12, wherein the zoom lens system satisfies a conditional expression below:

$$2.5<(f_w/f_1)\times(T_w/Y)<4.5,$$

where $f_w$ denotes an entire focal length at a wide-angle end, $f_t$ denotes an entire focal length at a telephoto end, and Tw denotes a distance between an image plane and an object side lens surface of a lens that is closest to the object side of the first lens group at a wide-angle end, and Y denotes a radical axis image height.

17. The zoom lens system of claim 12, wherein the zoom lens system satisfies conditional expressions below:

$$2.5<|f_1/f_w|<3.0,$$

$$0.8<|f_1/f_2|<1.0, \text{ and}$$

$$3.1<|f_2/f_w|<3.5,$$

where $f_1$ denotes a focal length of the first lens group, and $f_2$ denotes a focal length of the second lens group.

18. The zoom lens system of claim 12, wherein the first lens group comprises:
a first lens having a negative refractive power;
a second lens having a negative refractive power; and
a third lens having a positive refractive power,
wherein the first lens, the second lens, and the third lens are sequentially arranged from the object side to the image side, and the second lens and the third lens are cemented lenses.

19. The zoom lens system of claim 18, wherein the zoom lens system satisfies conditional expressions below:

$$vd_{12}>65, \text{ and}$$

$$Nd_{13}>1.90,$$

where $vd_{12}$ denotes an Abbe number of the second lens, and $Nd_{13}$ denotes a refractive index of the third lens at a d-line.

20. The zoom lens system of claim 11, further comprising a near infrared light blocking filter between the first lens group and the second lens group.

* * * * *